US011951962B1

(12) United States Patent
Kogan et al.

(10) Patent No.: US 11,951,962 B1
(45) Date of Patent: Apr. 9, 2024

(54) ACCELERATION DETECTION SYSTEM FOR A VEHICLE AND VEHICLE INCLUDING A BRAKE MONITORING UNIT WITH ACCELERATION DETECTION SYSTEM

(71) Applicant: ALSTOM Holdings, St Ouen sur Seine (FR)

(72) Inventors: Eugene Kogan, Rochester, NY (US); Boris Iordanov, Keswick (CA); Wayne Hintz, Bergen, NY (US); Andrew R. Carter, Canandaigua, NY (US); Mark Anthony Peryer, Jr., San Pedro, CA (US)

(73) Assignee: ALSTOM Holdings, St Ouen sur Seine (FR)

( * ) Notice: Subject to any disclaimer, the term of this patent is extended or adjusted under 35 U.S.C. 154(b) by 0 days.

(21) Appl. No.: 18/063,039

(22) Filed: Dec. 7, 2022

(51) Int. Cl.
*B60T 17/22* (2006.01)
*B60T 8/24* (2006.01)
*B60T 8/32* (2006.01)

(52) U.S. Cl.
CPC ............ *B60T 17/228* (2013.01); *B60T 8/24* (2013.01); *B60T 8/3205* (2013.01)

(58) Field of Classification Search
CPC ...... B60T 17/18; B60T 17/221; B60T 17/228; B60T 8/24; B60T 8/245; B60T 8/3205
See application file for complete search history.

(56) References Cited

U.S. PATENT DOCUMENTS

| | | | | |
|---|---|---|---|---|
| 6,477,465 B1* | 11/2002 | McCall | ............... | G01C 21/188 73/178 R |
| 2003/0236628 A1* | 12/2003 | Martorana | ........... | G01V 11/002 702/9 |
| 2015/0051806 A1* | 2/2015 | Kimiagar | ............... | B60T 7/128 701/93 |
| 2018/0229698 A1* | 8/2018 | Salmon | .................... | B60T 7/12 |

FOREIGN PATENT DOCUMENTS

| | | | | |
|---|---|---|---|---|
| CA | 2765095 A1 * | 5/2011 | ............ | G01C 21/16 |
| CN | 201000330 Y * | 1/2008 | | |

* cited by examiner

*Primary Examiner* — Hung Q Nguyen
(74) *Attorney, Agent, or Firm* — Knobbe, Martens, Olson & Bear, LLP

(57) ABSTRACT

An acceleration detection system for a vehicle includes at least one inertial measurement unit, which includes at least one acceleration sensor configured for measuring an acceleration of the vehicle. The acceleration detection system further includes a temperature sensor configured for measuring a temperature of the inertial measurement unit to obtain a measured temperature. A cooler is configured for cooling the inertial measurement unit in function of the measured temperature.

9 Claims, 1 Drawing Sheet

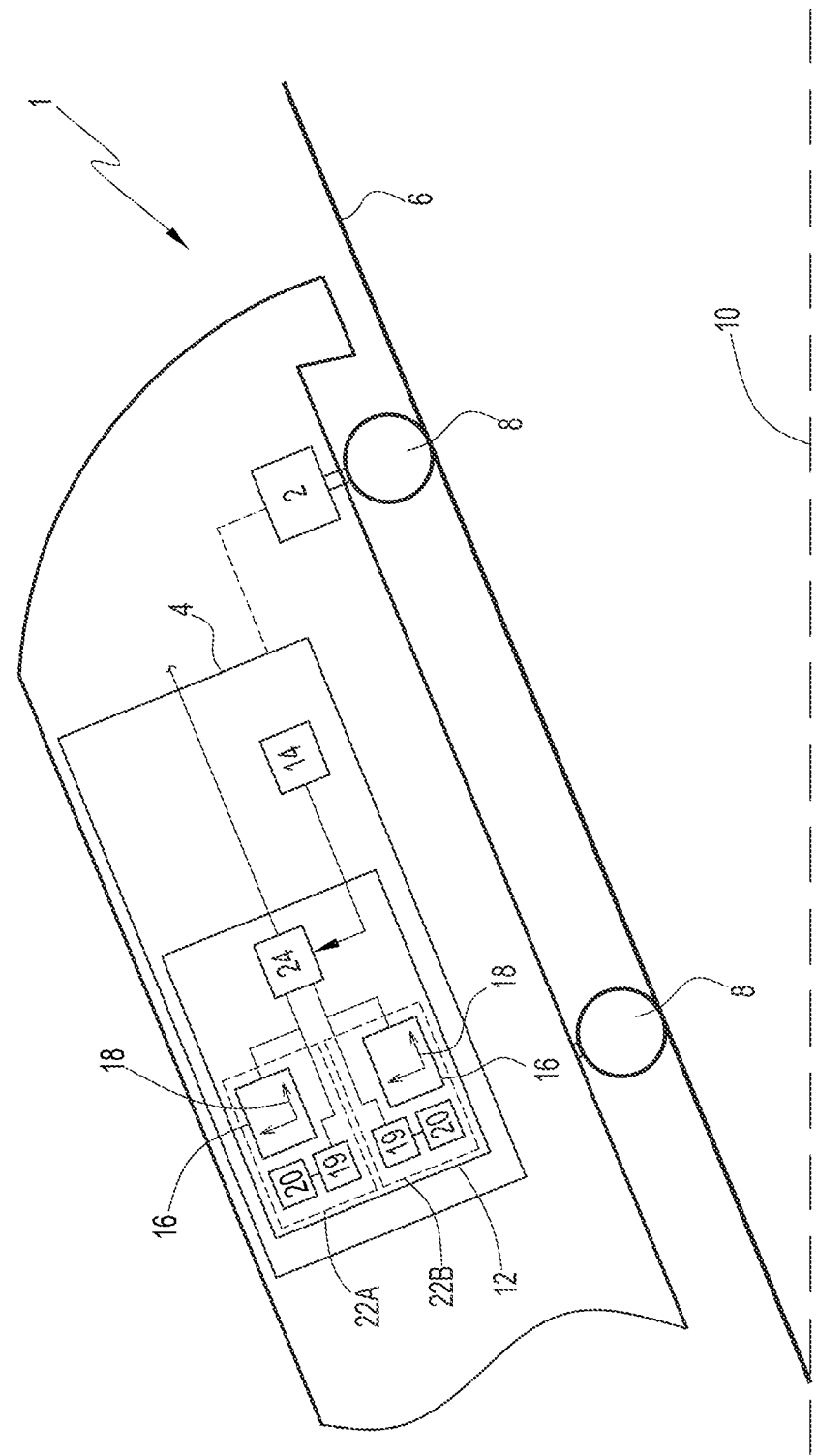

ACCELERATION DETECTION SYSTEM FOR A VEHICLE AND VEHICLE INCLUDING A BRAKE MONITORING UNIT WITH ACCELERATION DETECTION SYSTEM

FIELD OF THE INVENTION

The present disclosure concerns an acceleration detection system for a vehicle comprising at least one inertial measurement unit.

The present disclosure also relates to a vehicle comprising a brake monitoring unit configured for monitoring an operation of a braking system, wherein the brake monitoring unit comprises such acceleration detection system.

BACKGROUND OF THE INVENTION

Vehicles, such as railway vehicles, comprise generally braking systems configured for braking the vehicle. Such braking systems are critical for the safety of the vehicle. Therefore, the correct operation of such braking systems may be monitored by an additional system. If such additional system detects a failure of braking or insufficient braking, for example an emergency braking system of the vehicle and/or an alert may be activated.

In order to monitor and detect failure of the braking system, for example one or more accelerometers may be used. However, maintenance of such accelerometers may be required. Frequent maintenance or short operation intervals between the required maintenance may limit the operation of the railway vehicle.

According to other examples, other detectors or sensors may be used in order to detect failure in the braking system.

However, the known systems for monitoring the operation of braking systems may be further improved. In particular, the known monitoring systems comprising accelerometers have to be maintained very often, for example due to high measurement drift and/or unknown time periods during which a safe operation of the monitoring system is guaranteed.

SUMMARY OF THE INVENTION

An aim of the present disclosure is to remedy the above mentioned drawbacks.

In particular, an object of the present disclosure is to provide an acceleration detection system and a vehicle comprising such system which allow reducing the maintenance frequency and guaranteeing a safe and reliable operation at any time.

According to one aspect of the present disclosure, an acceleration detection system for a vehicle comprises at least one inertial measurement unit comprising at least one acceleration sensor configured for measuring an acceleration of the vehicle.

The acceleration detection system comprises a temperature sensor configured for measuring a temperature of the inertial measurement unit, called measured temperature. The acceleration detection system further comprises a cooler configured for cooling the inertial measurement unit in function of the measured temperature.

Indeed, the acceleration detection system allows reducing the frequency of maintenance operations, because the cooler reduces the temperature of the at least one inertial measuring unit in function in the measured temperature. In particular, the inventors have found that a high temperature of the inertial measurement unit may require very frequent maintenance, such as calibration. Such high temperatures are avoided, or at least reduced, by the cooler.

Further embodiments of the present disclosure may relate to one or more of the following features, which may be combined in any technical feasible combination:

the cooler is configured to be switched on when the measured temperature is higher or equal to a threshold temperature, and configured to be switched off otherwise;

the acceleration detection system comprises a controller configured to receive a signal comprising the measured temperature, wherein the controller is configured for determining a maximum operation time of the inertial measurement unit, during which the inertial measurement unit presents a measurement deviation smaller than or equal to a measurement deviation threshold, wherein the controller is configured for determining said maximum operation time in function of said signal comprising the measured temperature;

the measurement deviation corresponds to an offset of the acceleration measured by the at least one acceleration sensor compared with a calibration value;

the controller is configured for calculating an acceleration factor by using the Arrhenius equation when determining of the maximum operation time;

the controller is configured to calculate the acceleration factor according to the following formula:

$$AF = e^{\left(\frac{E_a}{k}\left(\frac{1}{T_{use}} - \frac{1}{T_{acc}}\right)\right)}$$

wherein:
AF is the acceleration factor;
$E_a$ is a predetermined activation energy;
k is the Boltzmann constant;
$T_{use}$ is the measured temperature in kelvin;
$T_{acc}$ is a predetermined temperature in kelvin of an accelerated lifetime test of the acceleration detection system;

the controller is configured to determine the maximum operation time by multiplying the acceleration factor with a predetermined number of hours, wherein the predetermined number of hours is equal to a duration of said accelerated lifetime test, wherein the measurement deviation of the inertial measurement unit is equal to the measurement deviation threshold when the inertial measurement unit is at said predetermined temperature during said predetermined number of hours;

the acceleration detection system comprises at least two inertial measurement units arranged in parallel measurement channels, wherein each inertial measurement unit comprises at least one acceleration sensor configured for measuring an acceleration of the vehicle.

The disclosure further relates to a vehicle comprising a braking system configured for braking the vehicle, and a brake monitoring unit configured for monitoring an operation of the braking system, wherein the brake monitoring unit comprises the acceleration detection system as described above.

According to an embodiment of the present disclosure, the vehicle may be a railway vehicle, wherein the brake monitoring unit comprises an inclination detection system configured for detecting an inclination of the railway vehicle with respect to a horizontal plane, wherein the brake monitoring unit is configured for monitoring the operation of the braking system by correcting the acceleration of the vehicle measured by the at least one acceleration sensor by the inclination detected by the inclination detection system so as to obtain a corrected acceleration, wherein the brake monitoring unit is further configured for comparing the corrected acceleration with an expected acceleration, so as to monitor the operation of the braking system.

BRIEF DESCRIPTION OF THE DRAWING

These features and advantages of the disclosure will be further explained in the following description, given only as a non-limiting example, and with reference to the attached drawing, wherein FIG. 1 is a schematic view of a vehicle comprising an acceleration detection system according to the present disclosure.

DETAILED DESCRIPTION OF THE PREFERRED EMBODIMENTS

With reference to the example of FIG. 1, a vehicle 1 comprises a braking system 2 configured for braking the vehicle 1 and a brake monitoring unit 4 configured for monitoring an operation of the braking system 2.

The vehicle 1 is for example a railway vehicle. In this case, the vehicle 1 is adapted to travel on rails 6 with its wheels 8 being in contact with the rails 6. In the example of the FIG. 1, the vehicle 1 is in particular adapted to travel on rails 6 having an inclination with respect to a horizontal plane 10.

By "inclination", it is understood that the vehicle 1 presents a longitudinal axis forming an angle greater than zero to the horizontal plane. The vehicle 1 is thus adapted to travel uphill or downhill for example. The longitudinal axis corresponds to the direction of travel of the vehicle 1.

According to other examples, the vehicle 1 is a street or terrain vehicle, an air vehicle, or a boat. In this case, the vehicle 1 also may be for example adapted to travel along a direction having an inclination with the horizontal plane 10.

The braking system 2 comprises for example mechanical and/or electromagnetic brakes configured to brake the vehicle 1. When the braking system 2 operates correctly, the vehicle 1 receives a negative acceleration upon braking.

By "acceleration", it is understood in the present disclosure an acceleration or deceleration according to any direction defined from the vehicle 1, in particular according to a longitudinal direction corresponding to the direction of travel of the vehicle 1. By "negative acceleration", it is understood in the present disclosure an acceleration along a direction opposite to the direction of travel of the vehicle 1.

The braking system 2 is for example configured for generating a brake command and send the brake command to the brakes of the braking system 2. The braking system 2 is for example further configured for generating a signal comprising an expected acceleration of the vehicle in function of the brake command and for sending the signal to the brake monitoring unit 4. The expected acceleration corresponds in particular to the acceleration applied to the vehicle 1 if the brakes of the braking system 2 operate correctly.

The brake monitoring unit 4 is for example configured for monitoring the operation of the braking system 2 by comparing the expected acceleration of the vehicle 1 due to the operation of the braking system 2 with a measured acceleration of the railway vehicle 1, possibly corrected by a detected inclination of the vehicle 1. If the measured acceleration is lower than the expected acceleration due to the operation of the braking system 2, the brake monitoring unit 4 is for example configured for sending a corresponding signal to an on-board computer (not shown) of the vehicle 1, and/or generating an alert for an operator of the vehicle 1.

The brake monitoring unit 4 comprises an acceleration detection system 12 and for example an inclination detection system 14.

The acceleration detection system 12 is configured to generate at least one measurement signal of an acceleration of the vehicle 1, called "measured acceleration". For example, the acceleration detection system 12 is configured for providing this measurement signal to a controller 24 of the acceleration detection system 12.

The inclination detection system 14 is configured for detecting an inclination of the vehicle 1 with respect to the horizontal plane 10. In particular, the inclination detection system 14 is configured for measuring an angle of the longitudinal axis of the vehicle 1 to the horizontal plane 10, and provide such measured angle to the controller 24.

According to another example, the brake monitoring unit 4 comprises an additional controller (not shown), in particular distinct from the controller 24, and being configured for receiving the inclination from the inclination detection system 14 so as to correct a measurement of the acceleration.

The brake monitoring unit 4 is configured for monitoring the operation of the braking system 2 in function of the measurement signal.

If the brake monitoring unit 4 comprises the inclination detection system 14, the brake monitoring unit 4, and in particular the controller 24, is for example configured for correcting the acceleration of the vehicle 1 measured by the acceleration detection system 12 according to the measurement signal by the inclination detected by the inclination detection system 14, so as to obtain a corrected acceleration. In particular, the brake monitoring unit 4 is configured for monitoring only the component(s) of acceleration of the vehicle 1, which correspond to the acceleration due to the operation of the braking system 2, in particular independently of a current inclination of the vehicle 1. This/these component(s) of acceleration are designated as the corrected acceleration.

The brake monitoring unit 4, in particular the controller 24, is for example further configured for comparing the corrected acceleration with the expected acceleration, so as to monitor the operation of the braking system 2. According to an example, the brake monitoring unit 4 is further configured for generating a corresponding signal for the on-board computer and/or an alert in function of the comparison.

The acceleration detection system 12 comprises at least one inertial measurement unit 16 (also called "IMU"), for example two inertial measurement units 16, comprising each at least one acceleration sensor 18 configured for measuring an acceleration of the vehicle 1.

The acceleration detection system 12 further comprises at least one temperature sensor 19, for example two temperature sensors 19, configured for measuring a temperature of the corresponding inertial measurement unit 16. This temperature is called "measured temperature" in the following.

The acceleration detection system 12 further comprises at least one cooler 20, for example two coolers 20, configured for cooling the corresponding inertial measurement unit 16 in function of the measured temperature.

In the example of FIG. 1, the acceleration detection system 12 comprises two inertial measurement units 16 arranged in parallel measurement channels 22a, 22b. In this case, for example, each measurement channel 22a, 22b, comprises a respective temperature sensor 19 and a respective cooler 20. For example, the inertial measurement unit 16 of each measurement channel 22a, 22b is configured for measuring the acceleration of the vehicle 1 independently from the other measurement channel. The arrangement in two parallel channels 22a, 22b allows improving safety of the measurement of the acceleration of the vehicle 1.

According to an example, the acceleration detection system 12 further comprises the controller 24 configured for receiving the measured acceleration of the vehicle 1 and/or a signal comprising the measured temperature. In addition, the controller 24 is for example configured for receiving the inclination of the vehicle 1 from the inclination detection system 14, and configured for obtaining the corrected acceleration.

Each inertial measurement unit 16 comprises at least one acceleration sensor 18. For example, each inertial measurement unit 16 comprises at least three or at least six measurement axes, each having a corresponding acceleration sensor 18 and being configured for measuring an acceleration a according to a corresponding direction of the vehicle 1. In addition, each inertial measurement unit 16 is for example configured for measuring at least one angular rate according to at least one direction of the vehicle 1.

Each inertial measurement unit 16 may be for example provided with an FPGA (from "Field-Programmable Gate Array") and/or a SoC (from "System on a Chip"), not shown in FIG. 1. The FPGA and/or SOC is in particular configured for processing the measurements for the or each acceleration sensor 18 of the inertial measurement unit 16.

According to an example, each inertial measurement unit 16 is for example be provided with a heat insulation (not shown), adapted to protect the inertial measurement 16 from heat.

For example, each inertial measurement unit 16 is fixed with respect to a cabin of the vehicle 1.

The or each cooler 20 is configured to receive the measured temperature from the corresponding temperature sensor 19. According to an example, the or each cooler 20 is configured to be switched on if the measured temperature is higher or equal to a threshold temperature, such as for example 40° C. or 50° C., and configured to be switched off otherwise.

The or each cooler 20 is for example a thermoelectric cooler. For example, the/each cooler 20 comprises at least one Peltier element configured to cool the corresponding inertial measurement unit 16.

The controller 24 comprises for example at least one processor (not shown) and at least one memory (not shown), wherein the processor is configured for processing data stored on the memory and/or received from the temperature sensor(s) 19 and/or the inertial measurement unit(s) 16. The controller 24 is for example implemented as a SoC. According to another example, or in addition, the controller 24 comprises an FPGA or a dedicated integrated circuit such as an ASIC (from "Application Specific Integrated Circuit").

The controller 24 is configured for determining a maximum operation time of the or each inertial measurement unit 16, during which the inertial measurement unit 16 presents a measurement deviation smaller than or equal to a measurement deviation threshold. The measurement deviation threshold is for example defined by an operator, by a test and/or by a specification of the vehicle 1.

The controller 24 is in particular configured for determining the maximum operation time in function of the signal comprising the measured temperature received from the corresponding temperature sensor 19.

The measurement deviation corresponds for example to an offset of the measured acceleration compared to a calibration value. The measurement deviation is in particular caused by device aging, in particular when acceleration measurement changes due to temperature exposure and time.

According to embodiments, the controller 24 is configured for determining the maximum operation time by calculating an acceleration factor AF using the Arrhenius equation.

In particular, the controller 24 is configured for calculating the acceleration factor AF according to the following formula:

$$AF = e^{\left(\frac{E_a}{k}\left(\frac{1}{T_{use}} - \frac{1}{T_{acc}}\right)\right)}$$

wherein:
AF is the acceleration factor;
$E_a$ is a predetermined activation energy for example in electronvolt;
k is the Boltzmann constant;
$T_{use}$ is the measured temperature in kelvin;
$T_{acc}$ is a predetermined temperature in kelvin of an accelerated lifetime test of the acceleration detection system 12.

Preferably, the controller 24 is configured for determining the maximum operation time by multiplying the acceleration factor AF with a predetermined number of hours.

The predetermined number of hours, the predetermined temperature and/or the predetermined activation energy is for example obtained by implementation of the accelerated lifetime test and/or fixed by an operator or a manufacturer. According to an example, the predetermined number of hours is chosen so that the acceleration detection system 12 presents substantial aging of its components after this number of hours.

The accelerated lifetime test is for example implemented at least once before operation of the vehicle 1.

The accelerated lifetime test may comprise exposing the acceleration detection system 12 to the predetermined temperature during the predetermined number of hours, and monitoring the measurement deviation of the acceleration detection system 12 during the test. For example, the measurement deviation of the inertial measurement unit 16 is equal the measurement deviation threshold, when the measurement unit 16 is exposed to the predetermined temperature during the predetermined number of hours.

In particular, a duration of the accelerated lifetime test is equal to the predetermined number of hours used by the controller 24 for determining the maximum operation time. In addition, for example, the predetermined temperature of the accelerated lifetime test is equal to the predetermined temperature used by the controller 24 for determining the maximum operation time.

According to an example, during operation of the vehicle 1, the acceleration detection system 12 is for example exposed only during a fraction of the total time of operation to temperatures equal to or higher than a fixed temperature. For example, only if the acceleration detection system 12 is exposed to temperatures equal to or higher than this fixed temperature, the measurement deviation may occur. In this case, for example, the controller 24 is configured for adjusting the determined maximum operation time in function of the fraction of time during which the acceleration detection system 12 is exposed to temperatures equal to or higher than this fixed temperature. For example, if the acceleration detection system 12 is exposed to such higher temperatures during half of the operation time only, the controller 24 is configured for doubling the maximum operation time.

For example, the controller 24 is configured for determining the maximum operation time only for measured temperatures higher than the fixed temperature, and adjusting the maximum operation time by adding, to this determined maximum operation time, the period(s) of operation during which the measured temperature is lower than the fixed temperature.

According to an example, the fixed temperature is equal to the temperature threshold.

According to an example, the controller 24 is configured for accumulating the periods during which the measured temperature is higher than the fixed temperature, and to adjust the determined maximum operation time accordingly.

Of course, other embodiments may be considered on the basis of the present disclosure.

What is claimed is:

1. An acceleration detection system for a vehicle comprising:
    at least one inertial measurement unit comprising at least one acceleration sensor configured for measuring an acceleration of the vehicle;
    a temperature sensor configured for measuring a temperature of the inertial measurement unit to obtain a measured temperature;
    a cooler configured for cooling the inertial measurement unit as a function of the measured temperature; and
    a controller configured to receive a signal comprising the measured temperature, wherein the controller is configured for determining a maximum operation time of the inertial measurement unit, during which the inertial measurement unit presents a measurement deviation smaller than or equal to a measurement deviation threshold, wherein the controller is configured for determining said maximum operation time in function of said signal comprising the measured temperature.

2. The acceleration detection system according to claim 1, wherein the cooler is configured to be switched on when the measured temperature is higher or equal to a threshold temperature, and configured to be switched off otherwise.

3. The acceleration detection system according to claim 1, wherein the measurement deviation corresponds to an offset of the acceleration measured by the at least one acceleration sensor compared with a calibration value.

4. The acceleration detection system according to claim 1, wherein the controller is configured for calculating an acceleration factor by using the Arrhenius equation when determining of the maximum operation time.

5. The acceleration detection system according to claim 4, wherein the controller is configured to calculate the acceleration factor according to the following formula:

$$AF = e^{\left(\frac{E_a}{k}\left(\frac{1}{T_{use}} - \frac{1}{T_{acc}}\right)\right)}$$

wherein:
    AF is the acceleration factor;
    E a is a predetermined activation energy;
    k is the Boltzmann constant;
    $T_{use}$ is the measured temperature in kelvin;
    $T_{acc}$ is a predetermined temperature in kelvin of an accelerated lifetime test of the acceleration detection system.

6. The acceleration detection system according to claim 5, wherein the controller is configured to determine the maximum operation time by multiplying the acceleration factor with a predetermined number of hours, wherein the predetermined number of hours is equal to a duration of said accelerated lifetime test, wherein the measurement deviation of the inertial measurement unit is equal to the measurement deviation threshold when the inertial measurement unit is at said predetermined temperature during said predetermined number of hours.

7. The acceleration detection system according to claim 1, comprising at least two inertial measurement units arranged in parallel measurement channels, wherein each inertial measurement unit comprises at least one acceleration sensor configured for measuring an acceleration of the vehicle.

8. A vehicle comprising a braking system configured for braking the vehicle, and a brake monitoring unit configured for monitoring an operation of the braking system, wherein the brake monitoring unit comprises the acceleration detection system according to claim 1.

9. The vehicle according to claim 8, wherein the vehicle is a railway vehicle, wherein the brake monitoring unit comprises an inclination detection system configured for detecting an inclination of the railway vehicle with respect to a horizontal plane, wherein the brake monitoring unit is configured for monitoring the operation of the braking system by correcting the acceleration of the vehicle measured by the at least one acceleration sensor by the inclination detected by the inclination detection system so as to obtain a corrected acceleration, wherein the brake monitoring unit is further configured for comparing the corrected acceleration with an expected acceleration, so as to monitor the operation of the braking system.

\* \* \* \* \*

UNITED STATES PATENT AND TRADEMARK OFFICE
CERTIFICATE OF CORRECTION

PATENT NO. : 11,951,962 B1  
APPLICATION NO. : 18/063039  
DATED : April 9, 2024  
INVENTOR(S) : Kogan et al.

Page 1 of 1

It is certified that error appears in the above-identified patent and that said Letters Patent is hereby corrected as shown below:

In the Claims

Column 8, Line 11, In Claim 5, delete "E a" and insert -- Ea --.

Signed and Sealed this  
Twenty-seventh Day of August, 2024

Katherine Kelly Vidal  
*Director of the United States Patent and Trademark Office*